(12) United States Patent
Ribour et al.

(10) Patent No.: US 11,236,221 B2
(45) Date of Patent: Feb. 1, 2022

(54) POLYETHYLENE RESIN AND CAPS OR CLOSURES MADE THEREFROM

(71) Applicant: TOTAL RESEARCH & TECHNOLOGY FELUY, Seneffe (BE)

(72) Inventors: David Ribour, Mairieux (FR); Alain Standaert, Brussels (BE); Armelle Sigwald, Nivelles (BE); Aurélien Vantomme, Mignault (BE)

(73) Assignee: Total Research & Technology Feluy, Seneffe (BE)

( * ) Notice: Subject to any disclaimer, the term of this patent is extended or adjusted under 35 U.S.C. 154(b) by 78 days.

(21) Appl. No.: 16/764,064

(22) PCT Filed: Nov. 12, 2018

(86) PCT No.: PCT/EP2018/080966
§ 371 (c)(1),
(2) Date: May 14, 2020

(87) PCT Pub. No.: WO2019/096745
PCT Pub. Date: May 23, 2019

(65) Prior Publication Data
US 2020/0385554 A1    Dec. 10, 2020

(30) Foreign Application Priority Data

Nov. 17, 2017  (EP) .................................... 17202388

(51) Int. Cl.
*C08F 210/16* (2006.01)
*C08L 23/02* (2006.01)
(Continued)

(52) U.S. Cl.
CPC ........ *C08L 23/0815* (2013.01); *B29C 43/003* (2013.01); *B29C 45/0001* (2013.01);
(Continued)

(58) Field of Classification Search
CPC ................ C08F 210/16; C08F 2500/05; C08F 2500/12; C08L 23/0815; C08L 2308/00; C08L 2205/02
See application file for complete search history.

(56) References Cited

U.S. PATENT DOCUMENTS 6,221,982 B1 * 4/2001 Debras .................... C08F 10/02
502/104
6,380,311 B1 * 4/2002 Razavi .................... C08F 10/02
525/191
(Continued)

FOREIGN PATENT DOCUMENTS

EP      3040375 A1   7/2016
WO  2011/095629 A1   8/2011
WO   2012101284 A1   8/2012

OTHER PUBLICATIONS

International Search Report issued in Application No. PCT/EP2018/080966, dated Feb. 13, 2019; 3 pages.
(Continued)

*Primary Examiner* — Rip A Lee
(74) *Attorney, Agent, or Firm* — Albert Shung

(57) ABSTRACT

The present invention relates to a polyethylene resin suitable for preparing moulded articles, such as caps and closures. The invention provides in particular a polyethylene resin comprising at least two polyethylene fractions A and B, wherein said polyethylene resin has a melt index (MI2), of at least 3.0 g/10 min to at most 5.5 g/10 min as measured according to ISO 1133, condition D, at 190° C. and under a load of 2.16 kg, and a density of at least 0.955 g/cm³ to at most 0.965 g/cm³ as measured according to ISO 1183 at 23° C., and a molecular weight distribution $M_w/M_n$ which is at most 7.0, as determined by gel permeation chromatography, with $M_w$ being the weight-average molecular weight and $M_n$ being the number-average molecular weight; and wherein
(Continued)

said polyethylene fraction A has a high load melt index (HLMI), as measured according to ISO 1133:1997 condition G at 190° C. and under a load of 21.6 kg, of at least 10.5 and a melt index (MI2) of at least 0.5 g/10 min to at most 1.5 g/10 min as measured according to ISO 1133, condition D, at 190° C. and under a load of 2.16 kg. The invention further relates to a process for preparing said polyethylene resin, to a cap or closure comprising said polyethylene, and to a process for producing such a cap or closure.

13 Claims, 1 Drawing Sheet

(51) Int. Cl.
  *C08L 23/08* (2006.01)
  *B29C 43/00* (2006.01)
  *B29C 45/00* (2006.01)
  *C08F 2/00* (2006.01)
  *C08F 110/02* (2006.01)
  *B29L 31/56* (2006.01)
(52) U.S. Cl.
  CPC ............ *C08F 2/001* (2013.01); *C08F 110/02* (2013.01); *C08F 210/16* (2013.01); *B29L 2031/56* (2013.01); *C08F 2500/05* (2013.01); *C08F 2500/12* (2013.01); *C08L 2203/10* (2013.01); *C08L 2314/02* (2013.01)

(56) References Cited

U.S. PATENT DOCUMENTS

| | | | |
|---|---|---|---|
| 6,864,207 B2 | 3/2005 | Knoeppel et al. | |
| 6,930,071 B2 | 8/2005 | Knoeppel et al. | |
| 7,592,395 B2 * | 9/2009 | Poloso | B65D 41/00 525/191 |
| 7,868,106 B2 * | 1/2011 | Stephenne | C08L 23/06 526/160 |
| 8,044,160 B2 * | 10/2011 | Nord-Varhaug | C08L 23/06 526/352 |
| 8,609,792 B2 * | 12/2013 | Vantomme | C08F 10/00 526/65 |
| 8,962,755 B2 * | 2/2015 | Wang | C08F 210/16 525/53 |
| 8,969,494 B2 * | 3/2015 | Standaert | C08F 210/16 526/160 |
| 9,340,631 B2 * | 5/2016 | Willocq | C08F 210/16 |
| 9,359,493 B2 * | 6/2016 | Ribour | C08L 23/04 |
| 9,371,442 B2 * | 6/2016 | Wang | C08L 23/08 |
| 9,411,062 B2 * | 8/2016 | Parkes | G01V 1/3808 |
| 9,505,893 B2 * | 11/2016 | Wang | B29C 41/22 |
| 9,976,017 B2 * | 5/2018 | Koch | B65D 41/00 |
| 10,377,886 B2 * | 8/2019 | Hiramoto | F16L 9/12 |
| 10,465,021 B2 * | 11/2019 | Vantomme | C08F 110/02 |
| 10,544,245 B1 * | 1/2020 | Vantomme | C08L 23/06 |
| 2009/0082523 A1 * | 3/2009 | Saito | C08F 10/02 525/53 |
| 2015/0259519 A1 | 9/2015 | Wang et al. | |
| 2018/0127573 A1 * | 5/2018 | Cottle | C08J 3/005 |

OTHER PUBLICATIONS

Plastics Additives Handbook, ed. H. Zweifel, 5th edition, 2001, Hanser Publishers.
Injection Moulding Handbook, D.V. Rosato et al., 3rd edition, 2000, Kluwer Academic Publishers.

* cited by examiner

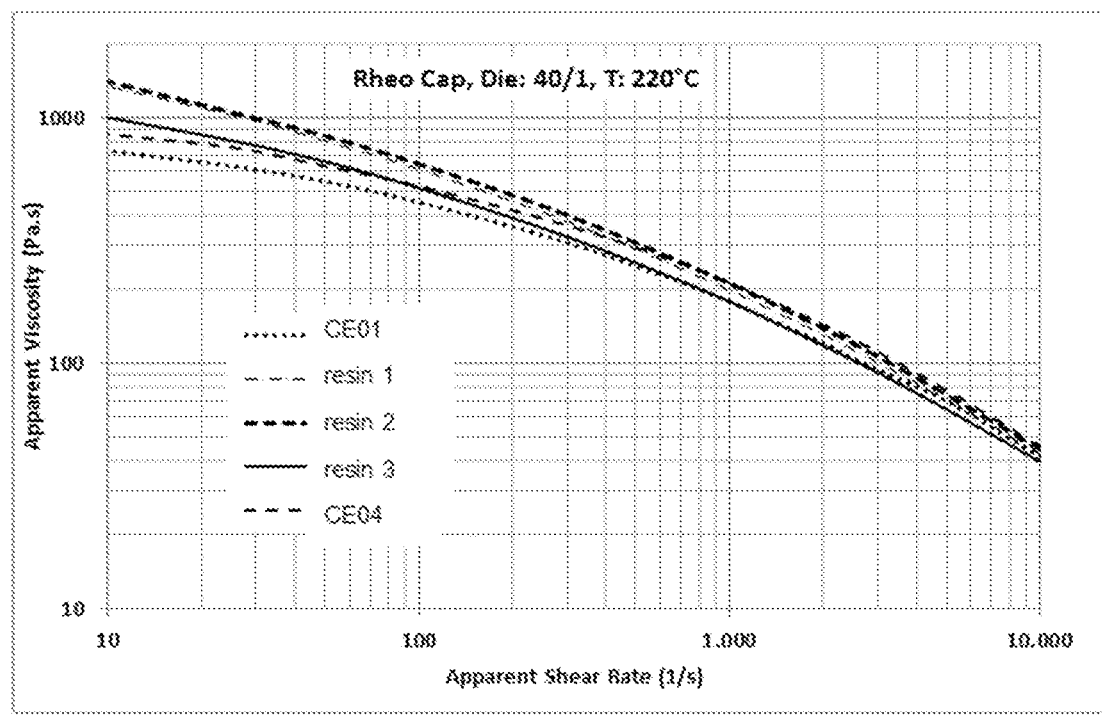

POLYETHYLENE RESIN AND CAPS OR CLOSURES MADE THEREFROM

CROSS-REFERENCE TO RELATED APPLICATIONS

This application claims the benefit of PCT/EP2018/080966 filed Nov. 12, 2018, which claims priority from EP 17202388.9 filed Nov. 17, 2017, which are incorporated herein by reference in their entireties for all purposes.

FIELD OF THE INVENTION

The present invention relates to a polyethylene resin suitable for preparing caps or closures and to a process for preparing said polyethylene resins. The present invention also relates to caps or closures comprising a polyethylene resin of the invention and to a process for the manufacture of such caps or closures.

BACKGROUND OF THE INVENTION

Caps and closures are widely used for various applications ranging from food and drink applications, such as for bottles containing carbonated or non-carbonated drinks, or for non-food applications such as containers for agrochemicals or chemicals (e.g. motor oil), cosmetics, or pharmaceuticals. Caps and closures are in general required to be strong enough to withstand the closure needs and soft enough to provide an excellent seal on the bottle or containers while not contributing to the taste or aroma of the bottle or container contents.

Polyethylene has become one of the materials of choice in the market of caps and closures because polyethylene offers a good balance of mechanical properties and can easily be processed either by injection moulding or by compression moulding. Important requirements for such polyethylene resin to be applied in the manufacture of caps and closures include appropriate rheological properties (processing ease), mechanical properties such as stiffness and environmental stress crack resistance (ESCR), and organoleptic properties, requirements which preferably need to be satisfied all at the same time.

It is for instance important that such polyethylene resin has the appropriate rheological properties, i.e. a flowability within certain limits to ensure that the final product properties are desirable. For example, the flowability of the polyethylene resin must be sufficiently high to enable it to flow to all areas of the mould when injected so as to form the desired cap or closure. Also, the higher the flow rate of the polyethylene melt, the greater the speed at which it can be injected into the mould and the shorter the processing time, which improves productivity.

In applications where caps and closures may be in contact with aggressive food and non-food media and/or subject to external stress, a sufficiently high stress crack resistance is of particular importance.

Furthermore, especially with regard to the food applications of caps and closures, it is important that the polyethylene has good taste and odor properties and low levels of extractables that can migrate into the food.

Moreover, recent efforts to reduce the weight of the polyethylene caps and closures have created a further need in the industry to develop polyethylene resins for caps and closures having even higher stress cracking resistance. Currently available resins have a reasonable high stress crack resistance, but they leave room for improvement.

Typically, polyethylene resins with higher densities and higher melt index have been applied in the art for producing caps and closures. Such resins, while having good processability and delivering articles with good organoleptic properties, leave room for improvement, since they generally provide a poorer ESCR, which may cause the formation of cracks around the injection point or at the edges of the caps or closures. In consequence, such resins present limitations for designing caps and closures that have superior ESCR requirements, such as caps for carbonated drinks or light-weight caps, as indicated above.

On the other hand, using polyethylene resins with lower densities and/or lower melt index for preparing caps and closures provides improved ESCR properties, but this is usually at the detriment of rheological and processing properties of the resins. The use of such type of resins may therefore lead to constrains in terms of mould shelf life, processing and cap functionality. Process modifications are needed for producing caps and closures from such type of resins, such as an increase in temperature due to a lower viscosity of the resin, as well as an increase of the clamping force of a mould during processing, which results in more mould wear. Also, due to the lower resin stiffness, caps or closures produced with such type of resins are softer and tend to show a higher bridge breaking force.

Therefore, in view of the above, there remains an ongoing need to develop caps and closures that display improved ESCR. Accordingly, there also remains an ongoing need to develop polyethylene resins for producing such caps and closures. However, such improved ESCR properties should not be at the cost of worsening other properties of the resins, or the caps or closures made therefrom. In particular, there remains an ongoing need to improve the ESCR of polyethylene resins for caps or closures without deterioration of processability, and other mechanical and organoleptic properties of the resins and caps or closures made therefrom.

Accordingly, it is an object of the present invention to provide a polyethylene resin and a cap or closure made therefrom having improved ESCR.

It is also an object of the present invention to provide a polyethylene resin and a cap or closure made therefrom having acceptable mechanical properties, such as e.g. stiffness.

It is also an object of the present invention to provide a polyethylene resin and a cap or closure made therefrom having acceptable organoleptic properties.

It is also an object of the present invention to provide a polyethylene resin and a cap or closure made therefrom having improved ESCR without deterioration of their other properties such as mechanical and organoleptic properties.

It is an additional object of the present invention to provide a polyethylene resin and a cap or closure made therefrom, having improved ESCR, while at the same time having acceptable or even improved processability. Yet another object of the invention is also to reduce mould wear and/or to increase the shelf life of the mould used for producing caps or closures.

SUMMARY OF THE INVENTION

It has now surprisingly been found that the above objectives can be attained either individually or in any combination by using the specific and well-defined polyethylene resin as disclosed herein for making said cap or closure.

Thus, according to a first aspect, the present invention provides a polyethylene resin comprising at least two polyethylene fractions A and B, wherein said polyethylene resin has a melt index (MI2), of at least 3.0 g/10 min to at most 5.5 g/10 min as measured according to ISO 1133, condition D, at 190° C. and under a load of 2.16 kg, and a density of at least 0.955 g/cm³ to at most 0.965 g/cm³ as measured according to ISO 1183 at 23° C., and a molecular weight distribution $M_w/M_n$ which is at most 7.0, as determined by gel permeation chromatography, with $M_w$ being the weight-average molecular weight and $M_n$ being the number-average molecular weight; and wherein said polyethylene fraction A has a high load melt index (HLMI), as measured according to ISO 1133:1997 condition G at 190° C. and under a load of 21.6 kg, of at least 10.5 and a melt index (MI2) as measured according to ISO 1133, condition D, at 190° C. and under a load of 2.16 kg of at least 0.5 g/10 min to at most 1.5 g/10 min.

According to a second aspect, the present invention relates to a process for preparing a polyethylene resin comprising at least two polyethylene fractions A and B according to the first aspect of the invention, comprising the steps of:
(a) feeding ethylene monomer, a diluent, at least one catalyst, optionally hydrogen, and optionally one or more olefin co-monomers into at least one first reactor; polymerizing the ethylene monomer, and the optionally one or more olefin co-monomers, in the presence of the catalyst, and optional hydrogen, in said first reactor to produce a polyethylene fraction A; and
(b) feeding the polyethylene fraction A to a second reactor serially connected to the first reactor, and in the second reactor polymerizing ethylene, and optionally one or more olefin co-monomers, in the presence of the polyethylene fraction A, and optionally hydrogen, thereby producing the polyethylene resin.

In another aspect, the present invention relates to a cap or closure comprising at least one polyethylene resin according to the first aspect of the invention.

The present invention also relates in another aspect to a process for producing a cap or closure according to the invention, comprising the steps of
(a) providing at least one polyethylene resin as described according to the first aspect of the invention, and
(b) injection moulding or compression moulding said polyethylene resin into a cap or closure.

In another aspect the invention provides for the use of a polyethylene resin according to the first aspect of the invention for producing a cap or closure.

The present invention further relates in another aspect to the use of a cap or closure as described herein or as produced by a process as described herein in the food or drink industry. In particular, the invention relates to the use of a cap or closure as described herein for the closure of a bottle or container containing a carbonated or a still drink.

The inventors have shown that polyethylene resins having the characteristics according to the present invention exhibit improved stress cracking resistance, concomitantly with excellent processing and excellent organoleptic properties. In view of such combination of properties, a polyethylene resin according to the invention is particularly suitable for manufacturing molded articles such as caps and closures.

The independent and dependent claims set out particular and preferred features of the invention. Features from the dependent claims may be combined with features of the independent or other dependent claims as appropriate.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

BRIEF DESCRIPTION OF THE FIGURES

FIG. 1 represents a graph plotting viscosity as a function of shear rate for polyethylene resins according to embodiments of the present invention, and comparative examples of polyethylene resins.

DETAILED DESCRIPTION OF THE INVENTION

When describing the invention, the terms used are to be construed in accordance with the following definitions, unless a context dictates otherwise.

As used herein, the singular forms "a", "an", and "the" include both singular and plural referents unless the context clearly dictates otherwise. By way of example, "a resin" means one resin or more than one resin.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

All references cited in the present specification are hereby incorporated by reference in their entirety. In particular, the teachings of all references herein specifically referred to are incorporated by reference.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art.

Preferred statements (features) and embodiments of the articles (cap or closures), resins and uses of this invention are set herein below. Each statement and embodiment of the invention so defined may be combined with any other statement and/or embodiment unless clearly indicated to the contrary. In particular, any feature indicated as being preferred or advantageous may be combined with any other feature or features or statements indicated as being preferred or advantageous. Hereto, the present invention is in particular captured by any one or any combination of one or more of the below numbered aspects and embodiments 1 to 38, with any other statement and/or embodiment.

1. A polyethylene resin comprising at least two polyethylene fractions A and B,
    wherein said polyethylene resin has
        a melt index (MI2), of at least 3.0 g/10 min to at most 5.5 g/10 min as measured according to ISO 1133, condition D, at 190° C. and under a load of 2.16 kg, and a density of at least 0.955 g/cm$^3$ to at most 0.965 g/cm$^3$ as measured according to ISO 1183 at 23° C., and
        a molecular weight distribution $M_w/M_n$ which is at most 7.0, as determined by gel permeation chromatography, with $M_w$ being the weight-average molecular weight and $M_n$ being the number-average molecular weight; and
    wherein said polyethylene fraction A has a high load melt index (HLMI), as measured according to ISO 1133:1997 condition G at 190° C. and under a load of 21.6 kg, of at least 10.5 and a melt index (MI2) of at least 0.5 g/10 min to at most 1.5 g/10 min as measured according to ISO 1133, condition D, at 190° C. and under a load of 2.16 kg.

2. Polyethylene resin according to statement 1, wherein said polyethylene resin has a molecular weight distribution $M_w/M_n$ which is at least 4.0, preferably at least 5.0, preferably at least 6.0, preferably at least 6.5.

3. Polyethylene resin according to statement 1 or 2, wherein said polyethylene resin has a molecular weight distribution $M_w/M_n$ which is comprised between 4.5 and 7.0, preferably between 5.5 and 7.0, preferably between 6.2 and 6.9, preferably between 6.5 and 6.9.

4. Polyethylene resin according to any one of statements 1 to 3, wherein said polyethylene fraction A has a high load melt index (HLMI), as measured according to ISO 1133:1997 condition G at 190° C. and under a load of 21.6 kg, of at most 50, preferably of at most 40.

5. Polyethylene resin according to any one of statements 1 to 4, wherein said polyethylene resin has a density of at least 0.956 g/cm$^3$ to at most 0.964 g/cm$^3$, preferably at least 0.957 g/cm$^3$ to at most 0.962 g/cm$^3$, preferably at least 0.959 g/cm$^3$ to at most 0.961 g/cm$^3$ as measured according to ISO 1183 at 23° C.

6. Polyethylene resin according to any one of statements 1 to 5, wherein said polyethylene resin has a melt index (MI2), of at least 3.5 g/10 min to at most 5.0 g/10 min, preferably of at least 3.6 g/10 min to at most 4.5 g/10 min as measured according to ISO 1133, condition D, at 190° C. and under a load of 2.16 kg.

7. Polyethylene resin according to any one of statements 1 to 6, wherein said polyethylene resin has a high load melt index (HLMI), according to ISO 1133:1997 condition G at 190° C. and under a load of 21.6 kg, of at least 150, preferably at least 155.

8. Polyethylene resin according to any one of statements 1 to 7, wherein said polyethylene fraction A has a high load melt index (HLMI), as measured according to ISO 1133:1997 condition G at 190° C. and under a load of 21.6 kg, of at least 11.0, preferably of at least 11.5.

9. Polyethylene resin according to any one of statements 1 to 8, wherein said polyethylene fraction A has a melt index (MI2), as measured according to ISO 1133, condition D, at 190° C. and under a load of 2.16 kg, of at least 0.5 g/10 min to at most 1.2 g/10 min, preferably of at least 0.5 g/10 min to at most 1.1 g/10 min.

10. Polyethylene resin according to any one of statements 1 to 9, wherein said polyethylene fraction A has a density of at least 0.940 g/cm$^3$ to at most 0.955 g/cm$^3$, preferably at least 0.942 g/cm$^3$ to at most 0.953 g/cm$^3$, preferably at least 0.945 g/cm$^3$ to at most 0.952 g/cm$^3$ as measured according to ISO 1183 at 23° C.

11. Polyethylene resin according to any one of statements 1 to 10, wherein said polyethylene resin comprises at least 35.0% to at most 60.0% by weight of polyethylene fraction A, based on the total weight of the polyethylene resin, preferably at least 40.0% to at most 55.0% by weight of polyethylene fraction A, for example at least 41.0% to at most 53.0% by weight of polyethylene fraction A.

12. Polyethylene resin according to any one of statements 1 to 11, comprising up to at most 2% by weight of the polyethylene resin, of one or more additives, preferably of a nucleating agent.

13. Polyethylene resin according to any one of statements 1 to 12, wherein said polyethylene fraction A is an ethylene copolymer and said polyethylene fraction B is an ethylene homopolymer.

14. Polyethylene resin according to any one of statements 1 to 13, wherein said polyethylene resin is a Ziegler-Natta-catalyzed polyethylene resin.

15. Process for preparing a polyethylene resin, wherein said polyethylene comprises at least two polyethylene fractions A and B,
    wherein said polyethylene resin has
        a melt index (MI2), of at least 3.0 g/10 min to at most 5.5 g/10 min as measured according to ISO 1133, condition D, at 190° C. and under a load of 2.16 kg, and
        a density of at least 0.955 g/cm$^3$ to at most 0.965 g/cm$^3$ as measured according to ISO 1183 at 23° C., and
        a molecular weight distribution $M_w/M_n$ which is at most 7.0, as determined by gel permeation chromatography, with $M_w$ being the weight-average molecular weight and $M_n$ being the number-average molecular weight; and
    wherein said polyethylene fraction A has a high load melt index (HLMI), as measured according to ISO 1133:1997 condition G at 190° C. and under a load of 21.6 kg, of at least 10.5 and a melt index (MI2) as measured according to ISO 1133, condition D, at 190° C. and under a load of 2.16 kg of at least 0.5 g/10 min to at most 1.5 g/10 min.
    said process comprising the steps of:
    (a) feeding ethylene monomer, a diluent, at least one catalyst, optionally hydrogen, and optionally one or more olefin co-monomers into at least one first reactor; polymerizing the ethylene monomer, and the optionally one or more olefin co-monomers, in the presence of the catalyst, and optional hydrogen, in said first reactor to produce a polyethylene fraction A; and
    (b) feeding the polyethylene fraction A to a second reactor serially connected to the first reactor, and in the second reactor polymerizing ethylene, and optionally one or more olefin co-monomers, in the presence of the polyethylene fraction A, and optionally hydrogen, thereby producing the polyethylene resin.

16. Process according to statement 15, wherein said polyethylene resin is as defined in any one of statements 1 to 14.

17. Process according to statement 15 or 16, wherein said process comprises the steps of:
    (a) feeding ethylene monomer, a diluent, at least one catalyst, optionally hydrogen, and one or more olefin co-monomers into at least one first reactor; polymerizing the ethylene monomer, and the one or more olefin co-monomers, in the presence of the catalyst, and optional hydrogen, in said first reactor to produce a polyethylene fraction A; and
    (b) feeding the polyethylene fraction A to a second reactor serially connected to the first reactor, and in the second reactor polymerizing ethylene, and optionally one or more olefin co-monomers, in the presence of the polyethylene fraction A, and optionally hydrogen, thereby producing the polyethylene resin.
18. Process according to statement 15 or 16, wherein said process comprises the steps of:
    (a) feeding ethylene monomer, a diluent, at least one catalyst, optionally hydrogen, and optionally one or more olefin co-monomers into at least one first reactor; polymerizing the ethylene monomer, and the one or more olefin co-monomers, in the presence of the catalyst, and optional hydrogen, in said first reactor to produce a polyethylene fraction A; and
    (b) feeding the polyethylene fraction A to a second reactor serially connected to the first reactor, and in the second reactor polymerizing ethylene, and one or more olefin co-monomers, in the presence of the polyethylene fraction A, and optionally hydrogen, thereby producing the polyethylene resin.
19. Process according to any one of statements 15 to 18, wherein said olefin co-monomer is selected from the group comprising C3-C20 alpha-olefins, preferably C3-C12 alpha-olefins, preferably C4-C8 alpha-olefins, preferably said co-monomer is selected from 1-butene or 1-hexene.
20. Process according to any one of statements 15 to 19, wherein said at least one catalyst is a Ziegler-Natta catalyst.
21. Use of a polyethylene resin for producing a moulded article, preferably an injection-moulded or a compression-moulded article, wherein said polyethylene resin comprises at least two polyethylene fractions A and B, and wherein said polyethylene resin has
    a melt index (MI2), of at least 3.0 g/10 min to at most 5.5 g/10 min as measured according to ISO 1133, condition D, at 190° C. and under a load of 2.16 kg, and
    a density of at least 0.955 g/cm$^3$ to at most 0.965 g/cm$^3$ as measured according to ISO 1183 at 23° C., and
    a molecular weight distribution $M_w/M_n$ which is at most 7.0, as determined by gel permeation chromatography, with $M_w$ being the weight-average molecular weight and $M_n$ being the number-average molecular weight; and
    wherein said polyethylene fraction A has a high load melt index (HLMI), as measured according to ISO 1133: 1997 condition G at 190° C. and under a load of 21.6 kg, of at least 10.5 and a melt index (MI2) as measured according to ISO 1133, condition D, at 190° C. and under a load of 2.16 kg of at least 0.5 g/10 min to at most 1.5 g/10 min.
22. Use of a polyethylene resin according to any one of statements 1 to 14 for producing a moulded article, preferably an injection-moulded or a compression-moulded article.
23. Use according to statement 21 or 22, wherein said moulded article is a cap or closure.
24. Use of a polyethylene resin for producing a cap or closure, wherein said polyethylene resin comprises at least two polyethylene fractions A and B, and wherein said polyethylene resin has
    a melt index (MI2), of at least 3.0 g/10 min to at most 5.5 g/10 min as measured according to ISO 1133, condition D, at 190° C. and under a load of 2.16 kg, and
    a density of at least 0.955 g/cm$^3$ to at most 0.965 g/cm$^3$ as measured according to ISO 1183 at 23° C., and
    a molecular weight distribution $M_w/M_n$ which is at most 7.0, as determined by gel permeation chromatography, with $M_w$ being the weight-average molecular weight and $M_n$ being the number-average molecular weight; and
    wherein said polyethylene fraction A has a high load melt index (HLMI), as measured according to ISO 1133: 1997 condition G at 190° C. and under a load of 21.6 kg, of at least 10.5 and a melt index (MI2) as measured according to ISO 1133, condition D, at 190° C. and under a load of 2.16 kg of at least 0.5 g/10 min to at most 1.5 g/10 min.
25. Use of a polyethylene resin according to any one of statements 1 to 14 for producing a cap or closure.
26. Use according to any one of statements 24 or 25 of a polyethylene resin for producing a cap or closure by injection moulding or by compression moulding.
27. Moulded article, preferably injection-moulded or compression-moulded article, comprising at least one polyethylene resin, wherein said polyethylene resin comprises at least two polyethylene fractions A and B,
    wherein said polyethylene resin has
        a melt index (MI2), of at least 3.0 g/10 min to at most 5.5 g/10 min as measured according to ISO 1133, condition D, at 190° C. and under a load of 2.16 kg, and
        a density of at least 0.955 g/cm$^3$ to at most 0.965 g/cm$^3$ as measured according to ISO 1183 at 23° C., and
        a molecular weight distribution $M_w/M_n$ which is at most 7.0, as determined by gel permeation chromatography, with $M_w$ being the weight-average molecular weight and $M_n$ being the number-average molecular weight; and
    wherein said polyethylene fraction A has a high load melt index (HLMI), as measured according to ISO 1133: 1997 condition G at 190° C. and under a load of 21.6 kg, of at least 10.5 and a melt index (MI2) as measured according to ISO 1133, condition D, at 190° C. and under a load of 2.16 kg of at least 0.5 g/10 min to at most 1.5 g/10 min.
28. Moulded article, preferably injection-moulded or compression-moulded article comprising at least one polyethylene resin according to any one of the statement of 1 to 14.
29. Moulded article according to statement 27 or 28, wherein said moulded article is a cap or closure.
30. Cap or closure comprising at least one polyethylene resin, wherein said polyethylene resin comprises at least two polyethylene fractions A and B,
    wherein said polyethylene resin has
        a melt index (MI2), of at least 3.0 g/10 min to at most 5.5 g/10 min as measured according to ISO 1133, condition D, at 190° C. and under a load of 2.16 kg, and a density of at least 0.955 g/cm$^3$ to at most 0.965 g/cm$^3$ as measured according to ISO 1183 at 23° C., and
        a molecular weight distribution $M_w/M_n$ which is at most 7.0, as determined by gel permeation chromatography, with $M_w$ being the weight-average molecular weight and $M_n$ being the number-average molecular weight; and wherein said polyethylene fraction A has a high load melt index (HLMI), as measured according to ISO 1133: 1997 condition G at 190° C. and under a load of 21.6 kg, of at least 10.5 and a melt index (MI2) as measured according to ISO 1133, condition D, at 190° C. and under a load of 2.16 kg of at least 0.5 g/10 min to at most 1.5 g/10 min.

31. Cap or closure comprising at least one polyethylene resin according to any one of the statement of 1 to 14.

32. A process for producing a moulded article, said process comprising the steps of:
  a) providing at least one polyethylene resin, wherein said polyethylene resin comprises at least two polyethylene fractions A and B, and wherein said polyethylene resin has
    a melt index (MI2), of at least 3.0 g/10 min to at most 5.5 g/10 min as measured according to ISO 1133, condition D, at 190° C. and under a load of 2.16 kg, and
    a density of at least 0.955 g/cm$^3$ to at most 0.965 g/cm$^3$ as measured according to ISO 1183 at 23° C., and
    a molecular weight distribution $M_w/M_n$ which is at most 7.0, as determined by gel permeation chromatography, with $M_w$ being the weight-average molecular weight and $M_n$ being the number-average molecular weight; and
  wherein said polyethylene fraction A has a high load melt index (HLMI), as measured according to ISO 1133: 1997 condition G at 190° C. and under a load of 21.6 kg, of at least 10.5 and a melt index (MI2) of at least 0.5 g/10 min to at most 1.5 g/10 min as measured according to ISO 1133, condition D, at 190° C. and under a load of 2.16 kg; and
  b) injection moulding or compression moulding said polyethylene resin into a moulded article.

33. A process for producing a moulded article, said process comprising the steps of:
  a) providing at least one polyethylene resin as described in any one of statements 1 to 14; and
  b) injection moulding or compression moulding said polyethylene resin into a moulded article.

34. A process for producing a cap or closure, said process comprising the steps of:
  a) providing at least one polyethylene resin, wherein said polyethylene resin comprises at least two polyethylene fractions A and B, and wherein said polyethylene resin has
    a melt index (MI2), of at least 3.0 g/10 min to at most 5.5 g/10 min as measured according to ISO 1133, condition D, at 190° C. and under a load of 2.16 kg, and
    a density of at least 0.955 g/cm$^3$ to at most 0.965 g/cm$^3$ as measured according to ISO 1183 at 23° C., and
    a molecular weight distribution $M_w/M_n$ which is at most 7.0, as determined by gel permeation chromatography, with $M_w$ being the weight-average molecular weight and $M_n$ being the number-average molecular weight; and
  wherein said polyethylene fraction A has a high load melt index (HLMI), as measured according to ISO 1133: 1997 condition G at 190° C. and under a load of 21.6 kg, of at least 10.5 and a melt index (MI2) as measured according to ISO 1133, condition D, at 190° C. and under a load of 2.16 kg of at least 0.5 g/10 min to at most 1.5 g/10 min, and
  b) injection moulding or compression moulding said polyethylene resin into a cap or closure.

35. A process for producing a cap or closure said process comprising the steps of:
  a) providing at least one polyethylene resin as described in any one of statements 1 to 14; and
  b) injection moulding or compression moulding said polyethylene resin into a cap or closure.

36. Use of a moulded article according to any one of statement 27 to 29 or produced by a process according to any one of statements 32 or 33 in the food or drink industry.

37. Use of a cap or closure according to any one of statement 30 or 31 or produced by a process according to any one of statements 34 or 35 in the food or drink industry.

38. Use of a cap or closure according to statement 37 for the closure of a bottle or container containing a carbonated or a still drink.

The term "polyethylene resin" as used herein refers to the polyethylene fluff or powder that is extruded, and/or melted and pelleted and can be produced through compounding and homogenizing of the polyethylene resin as taught herein, for instance, with mixing and/or extruder equipment. The measures of density and melt index of the polyethylene resin, given in the claims or the description, are performed on the pelleted form. Under normal production conditions in a production plant it is expected that the melt index MI2 will be higher for the fluff, compared to the resin (pellets).

The term "fluff" or "powder" as used herein refers to the polyethylene material with the hard catalyst particle at the core of each grain and is defined as the material after it exits the polymerization reactor (or final polymerization reactor in the case of multiple reactors connected in series) but not pelleted, extruded and/or melted. The measures of density and melt index of polyethylene fraction A of the polyethylene resin, given in the claims or the description, are performed on the fluff.

The present invention relates to a polyethylene resin comprising at least two polyethylene fractions A and B, wherein said polyethylene resin has a melt index (MI2), of at least 3.0 g/10 min to at most 5.5 g/10 min as measured (on pellets) according to ISO 1133, condition D, at 190° C. and under a load of 2.16 kg, and a density of at least 0.955 g/cm$^3$ to at most 0.965 g/cm$^3$ as measured (on pellets) according to ISO 1183 at 23° C., and a molecular weight distribution $M_w/M_n$ which is at most 7.0, as determined by gel permeation chromatography, with $M_w$ being the weight-average molecular weight and $M_n$ being the number-average molecular weight; and wherein said polyethylene fraction A has a high load melt index (HLMI), as measured (on fluff) according to ISO 1133:1997 condition G at 190° C. and under a load of 21.6 kg, of at least 10.5, and a melt index of at least 0.5 g/10 min to at most 1.5 g/10 min as measured according to ISO 1133, condition D, at 190° C. and under a load of 2.16 kg.

In some embodiments, the polyethylene resin may comprise a molecular weight distribution $M_w/M_n$ which is at least 4.0, preferably at least 5.0, preferably at least 6.0, preferably at least 6.5. Alternatively or additionally, in some embodiments the polyethylene resin can have a molecular weight distribution $M_w/M_n$ which is comprised between 4.5 and 7.0, preferably between 5.5 and 7.0, preferably between 6.2 and 6.9, preferably between 6.5 and 6.9.

In certain embodiments, the polyethylene resin may comprise a density of at least 0.956 g/cm³ to at most 0.964 g/cm³, preferably at least 0.957 g/cm³ to at most 0.962 g/cm³, preferably at least 0.959 g/cm³ to at most 0.961 g/cm³, as measured according to ISO 1183 at 23° C.

In some embodiments, the polyethylene resin may comprise a melt index (MI2) of at least 3.0 g/10 min to at most 5.5 g/10 min, preferably of at least 3.5 g/10 min to at most 5.0 g/10 min, preferably of at least 3.6 g/10 min to at most 4.5 g/10 min as measured according to ISO 1133, condition D, at 190° C. and under a load of 2.16 kg.

In certain embodiments, the polyethylene resin may have a high load melt index (HLMI), according to ISO 1133:1997 condition G at 190° C. and under a load of 21.6 kg, of at least 150, preferably at least 155.

In some preferred embodiments, the polyethylene resin as provided has a multimodal molecular weight distribution, and preferably has a bimodal molecular weight distribution.

As used herein, the term "monomodal polyethylene" or "polyethylene with a monomodal molecular weight distribution" refers to polyethylene having one maximum in their molecular weight distribution curve, which is also defined as a unimodal distribution curve. As used herein, the term "polyethylene with a bimodal molecular weight distribution" or "bimodal polyethylene" it is meant, polyethylene having a distribution curve being the sum of two unimodal molecular weight distribution curves, and refers to a polyethylene product having two distinct but possibly overlapping populations of polyethylene macromolecules each having different weight average molecular weights. By the term "polyethylenes with a multimodal molecular weight distribution" or "multimodal polyethylenes" it is meant polyethylenes with a distribution curve being the sum of at least two, preferably more than two unimodal distribution curves, and refers to a polyethylene product having two or more distinct but possibly overlapping populations of polyethylene macromolecules each having different weight average molecular weights. The multimodal polyethylene resin can have an "apparent monomodal" molecular weight distribution, which is a molecular weight distribution curve with a single peak and no shoulder. Nevertheless, the polyethylene resin will still be multimodal if it comprises two distinct populations of polyethylene macromolecules each having a different weight average molecular weights, as defined above, for example when the two distinct populations were prepared in different reactors and/or under different conditions.

The present inventors have shown that the polyethylene resins as specifically defined herein provide a good balance in ESCR properties and mechanical properties. It was found that the present polyethylene resins, besides showing improved ESCR, retain excellent processability and acceptable rheological properties, even if the resins combine higher densities with a lower melt index and a relatively narrow MWD. In view of these properties, the present polyethylene resin can be processed at a higher productivity, e.g. by using lower melt temperatures for faster cycle time (lower cooling time). Additional benefits when processing the polyethylene resin may include the possibility of using lower injection/holding pressure and mould clamping force, permitting not only to reduce energy input, but also to increase mould shelf life. Moreover, the polyethylene resins as defined herein deliver satisfying organoleptic properties. Hence, the specific combination of above-indicated parameters provides a polyethylene resin as defined herein that is particularly suitable for use in closure applications, for instance for producing caps or closures of low weight.

As indicated herein, the polyethylene resin according to the first aspect of the invention thus comprises at least two polyethylene fractions A and B.

In some embodiments, said polyethylene fraction A has a high load melt index (HLMI), as measured (on fluff) according to ISO 1133:1997 condition G at 190° C. and under a load of 21.6 kg, of at least 10.5. In a preferred embodiment, said polyethylene fraction A has a high load melt index (HLMI), as measured according to ISO 1133:1997 condition G at 190° C. and under a load of 21.6 kg, of at least 11.0, preferably of at least 11.5.

In some embodiment, said polyethylene fraction A has a high load melt index (HLMI), as measured (on fluff) according to ISO 1133:1997 condition G at 190° C. and under a load of 21.6 kg, of at most 50, preferably of at most 40.

In some embodiments, said polyethylene fraction A has a melt index (MI2), of at least 0.5 g/10 min to at most 1.5 g/10 min, preferably of at least 0.5 g/10 min to at most 1.2 g/10 min, preferably of at least 0.5 g/10 min to at most 1.1 g/10 min, as measured (on fluff) according to ISO 1133, condition D, at 190° C. and under a load of 2.16 kg.

In certain embodiments, said polyethylene fraction A has a density as measured on the polymer material after it exits the polymerization reactor (fluff) of at least 0.005 g/cm³ lower than the density of the polyethylene resin, preferably at least 0.007 g/cm³ lower, and for instance at least 0.010 g/cm³ lower than the density of the polyethylene resin, as measured (on fluff) according to ISO 1183 at 23° C. In some embodiments, said polyethylene fraction A has a density of at least 0.940 g/cm³ to at most 0.955 g/cm³, preferably at least 0.942 g/cm³ to at most 0.953 g/cm³, preferably at least 0.945 g/cm³ to at most 0.952 g/cm³ as measured (on fluff) according to ISO 1183 at 23° C.

In some embodiments, said polyethylene resin may comprise at least 35.0% by weight to at most 60.0% by weight of polyethylene fraction A, based on the total weight of the polyethylene resin, preferably at least 40.0% to at most 55.0% by weight of polyethylene fraction A, for example at least 41.0% to at most 53.0% by weight of polyethylene fraction A.

In some embodiment, said polyethylene resin may comprise one or more additives, in particular additives suitable for injection and compression moulding, such as, by way of example, processing aids, mould-release agents, primary and secondary antioxidants, acid scavengers, flame retardants, fillers, nanocomposites, lubricants, antistatic additives, nucleating/clarifying agents, antibacterial agents, plasticizers, colorants/pigments/dyes and mixtures thereof. Illustrative pigments or colorants include titanium dioxide, carbon black, cobalt aluminum oxides such as cobalt blue, and chromium oxides such as chromium oxide green. Pigments such as ultramarine blue, phthalocyanine blue and iron oxide red are also suitable. Specific examples of additives include lubricants and mould-release agents such as calcium stearate, zinc stearate, antioxidants such as Irgafos 168™, Irganox 1010™, and Irganox 1076™, and nucleating agents such as Milliken HPN20E™ or HPN-210M™. These additives may be included in amounts effective to impart the desired properties.

An overview of the additives that can be used in the injection-moulded or compression-moulded articles, in particular the caps and closures, may be found in Plastics Additives Handbook, ed. H. Zweifel, 5th edition, 2001, Hanser Publishers.

Particularly preferred additives include nucleating agents. In some preferred embodiments, the polyethylene resin may comprise up to at most 2% by weight of the polyethylene resin of a nucleating agent.

The polyethylene resin according to the first aspect of the invention can in general be produced by polymerizing ethylene and one or more optional co-monomers, optionally hydrogen, in the presence of a catalyst system.

As used herein, the term "catalyst" refers to a substance that causes a change in the rate of a polymerization reaction. In the present invention, it is especially applicable to catalysts suitable for the polymerization of ethylene to polyethylene.

The polyethylene resin can be produced using any catalyst known in the art, such as chromium catalysts, Ziegler-Natta catalysts and metallocene catalysts.

Preferably, the polyethylene resin is formed using at least one Ziegler-Natta catalyst. As used herein, the terms "Ziegler-Natta-catalyzed polyethylene resin", and "Ziegler-Natta-catalyzed polyethylene" are synonymous and used interchangeably and refer to a polyethylene prepared in the presence of a Ziegler-Natta catalyst.

The term "Ziegler-Natta catalyst" or "ZN catalyst" refers to catalysts having a general formula $M^1X_v$, wherein $M^1$ is a transition metal compound selected from group IV to VIII, wherein X is a halogen, and wherein v is the valence of the metal. Preferably, $M^1$ is a group IV, group V or group VI metal, more preferably titanium, chromium or vanadium and most preferably titanium. Preferably, X is chlorine or bromine, and most preferably, chlorine. Illustrative examples of the transition metal compounds comprise but are not limited to $TiCl_3$, $TiCl_4$. Suitable ZN catalysts for use in the invention are described in U.S. Pat. Nos. 6,930,071 and 6,864,207, which are incorporated herein by reference. Preferred Ziegler-Natta catalysts for use herein are also for instance those as disclosed in WO 2011/095629, which is incorporated herein by reference.

One or more aluminiumalkyl represented by the formula $AlR^b_x$ can be used as additional co-catalyst, wherein each $R^b$ is the same or different and is selected from halogens or from alkoxy or alkyl groups having from 1 to 12 carbon atoms and x is from 1 to 3. Non-limiting examples are Tri-Ethyl Aluminum (TEAL), Tri-Iso-Butyl Aluminum (TIBAL), Tri-Methyl Aluminum (TMA), and Methyl-Methyl-Ethyl Aluminum (MMEAL). Especially suitable are trialkylaluminiums, the most preferred being triisobutylaluminium (TIBAL) and triethylaluminum (TEAL).

A preferred Ziegler-Natta catalyst system may encompass a titanium compound having at least one titanium-halogen bond and an optional internal electron donor, both on a suitable support (for example on a magnesium halide in active form), an organoaluminium compound (such as an aluminium trialkyl), and an optional external donor.

The invention further encompasses a process for preparing said polyethylene resin. Suitable ethylene polymerization for preparing the polyethylene resin includes but is not limited to homopolymerization of ethylene, or copolymerization of ethylene and a higher alpha-olefin co-monomer.

As used herein, the term "co-monomer" refers to olefin co-monomers which are suitable for being polymerized with alpha-olefin monomer. Co-monomers may comprise but are not limited to aliphatic $C_3$-$C_{20}$ alpha-olefins. Examples of suitable aliphatic $C_3$-$C_{20}$ alpha-olefins include propylene, 1-butene, 1-pentene, 4-methyl-1-pentene, 1-hexene, 1-octene, 1-decene, 1-dodecene, 1-tetradecene, 1-hexadecene, 1-octadecene, and 1-eicosene. In some embodiments of the present invention, said co-monomer is 1-butene or 1-hexene.

In some embodiments, said polyethylene fraction A of the polyethylene resin can be an ethylene homopolymer or an ethylene copolymer, preferably an ethylene copolymer. In some embodiments, said polyethylene fraction B of the polyethylene resin can be an ethylene homopolymer or an ethylene copolymer, preferably an ethylene homopolymer. In a preferred embodiment said polyethylene fraction A is an ethylene copolymer and said polyethylene fraction B is an ethylene homopolymer.

The term "ethylene copolymer" as used herein is intended to encompass polymers which consist essentially of repeat units deriving from ethylene and at least one other alpha-olefin co-monomer. The term "ethylene homopolymer" as used herein is intended to encompass polymers which consist essentially of repeat units deriving from ethylene. Homopolymers may, for example, comprise at least 99.8% preferably 99.9% by weight of repeats units derived from ethylene.

Preferably, said polyethylene resin is prepared in two or more serially connected reactors. In some embodiments, said polyethylene resin is provided, wherein each fraction is prepared in a different reactor of two reactors connected in series.

In certain embodiments, the polyethylene resin may preferably be obtained by operating the at least two reactors under different polymerization conditions.

The polyethylene resin can be prepared in gas, solution or slurry phase. Slurry polymerization is preferably used to prepare the polyethylene resin, preferably in a slurry loop reactor or a continuously stirred reactor.

Preferably, in some embodiments said polyethylene resin may be prepared in two or more serially connected reactors, comprising at least one first and at least one second reactor, preferably loop reactors, more preferably slurry loop reactors, most preferably liquid full loop reactors, in the presence of same or different catalysts, preferably a ZN catalyst. The most preferred polymerization process is carried out in two serially connected slurry loop reactors, advantageously liquid full loop reactors i.e. a double loop reactor.

As used herein, the terms "loop reactor" and "slurry loop reactor" may be used interchangeably herein.

The catalyst is preferably added to the loop reactor as catalyst slurry. As used herein, the term "catalyst slurry" refers to a composition comprising catalyst solid particles and a diluent. The solid particles can be suspended in the diluent, either spontaneously or by homogenization techniques, such as mixing. The solid particles can be non-homogeneously distributed in a diluent and form sediment or deposit.

As used herein, the term "diluent" refers to any organic diluent, which does not dissolve the synthesized polyolefin. As used herein, the term "diluent" refers to diluents in a liquid state, liquid at room temperature and preferably liquid under the pressure conditions in the loop reactor. Suitable diluents comprise but are not limited to hydrocarbon diluents such as aliphatic, cycloaliphatic and aromatic hydrocarbon solvents, or halogenated versions of such solvents. Preferred solvents are $C_{12}$ or lower, straight chain or branched chain, saturated hydrocarbons, $C_5$ to $C_9$ saturated alicyclic or aromatic hydrocarbons or $C_2$ to $C_6$ halogenated hydrocarbons. Non-limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane, preferably isobutane.

In certain embodiments, each loop reactor may comprise interconnected pipes, defining a reactor path. In certain embodiments, each loop reactor may comprise at least two vertical pipes, at least one upper segment of reactor piping, at least one lower segment of reactor piping, joined end to end by junctions to form a complete loop, one or more feed lines, one or more outlets, one or more cooling jackets per pipe, and one pump, thus defining a continuous flow path for a polymer slurry. The vertical sections of the pipe segments are preferably provided with cooling jackets. Polymerization heat can be extracted by means of cooling water circulating in these jackets of the reactor. The loop reactor preferably operates in a liquid full mode.

In certain embodiments, the first and second loop reactors may be connected through means such as a transfer line or one or more settling legs. In some embodiments, the first polyethylene fraction may be transferred from the first loop reactor to the second loop reactor through a transfer line. In some embodiments, the first polyethylene fraction may be discharged in batches, sequentially or continuously from the first loop reactor through one or more settling legs, and transferred to the second loop reactor via a transfer line.

In some embodiments, the invention encompasses a process for preparing the polyethylene resin as described herein that may comprise the steps of:
(a) feeding ethylene monomer, a diluent, at least one catalyst, optionally hydrogen, and optionally one or more olefin co-monomers into at least one first reactor; polymerizing the ethylene monomer, and the optionally one or more olefin co-monomers, in the presence of the catalyst, and optional hydrogen, in said first reactor to produce a polyethylene fraction A; and
(b) feeding the polyethylene fraction A to a second reactor serially connected to the first reactor, and in the second reactor polymerizing ethylene, and optionally one or more olefin co-monomers, in the presence of the polyethylene fraction A, and optionally hydrogen, thereby producing the polyethylene resin.

In some preferred embodiments, the process for preparing the polyethylene resin may comprise the steps of:
(a) feeding ethylene monomer, a diluent, at least one catalyst, optionally hydrogen, and one or more olefin co-monomers into at least one first reactor; polymerizing the ethylene monomer, and the one or more olefin co-monomers, in the presence of the catalyst, and optional hydrogen, in said first reactor to produce a polyethylene fraction A; and
(b) feeding the polyethylene fraction A to a second reactor serially connected to the first reactor, and in the second reactor polymerizing ethylene, and optionally one or more olefin co-monomers, in the presence of the polyethylene fraction A, and optionally hydrogen, thereby producing the polyethylene resin.

In some alternative embodiments, the process for preparing the polyethylene resin may comprise the steps of:
a) feeding ethylene monomer, a diluent, at least one catalyst, optionally hydrogen, and optionally one or more olefin co-monomers into at least one first reactor; polymerizing the ethylene monomer, and the one or more olefin co-monomers, in the presence of the catalyst, and optional hydrogen, in said first reactor to produce a polyethylene fraction A; and
b) feeding the polyethylene fraction A to a second reactor serially connected to the first reactor, and in the second reactor polymerizing ethylene, and one or more olefin co-monomers, in the presence of the polyethylene fraction A, and optionally hydrogen, thereby producing the polyethylene resin.

The polymerization steps may be performed over a wide temperature range. In certain embodiments, the polymerization steps may be performed at a temperature from 20° C. to 120° C., preferably from 60° C. to 110° C., more preferably from 75° C. to 100° C. and most preferably from 78° C. to 98° C. Preferably, the temperature range may be within the range from 75° C. to 100° C. and most preferably from 78° C. to 98° C.

In certain embodiments, the polymerization steps may be performed at a pressure from about 20 bar to about 100 bar, preferably from about 30 bar to about 50 bar, and more preferably from about 37 bar to about 45 bar.

In a preferred embodiment said at least one catalyst is a Ziegler-Natta catalyst, preferably a Ziegler-Natta catalyst as described herein.

In a preferred embodiment said co-monomer is as described herein.

In some embodiments, reactants comprise the monomer ethylene, isobutane as hydrocarbon diluent, and a ZN catalyst, and optionally at least one co-monomer such as 1-hexene is used.

The present polyethylene resin can be particularly useful for producing a moulded article. Such article may include any injection-moulded or compression-moulded article, such as but not limited to a tank, a drum, a container, a bin, a vat, a jerrycan, a can, a cistern, slosh baffle, a connector, a cap or closure, or any other component. Therefore, the invention also encompasses a moulded article, preferably an injection-moulded or compression-moulded article, comprising at least one polyethylene resin as described herein. Preferred embodiments encompass a cap or closure comprising at least one polyethylene resin as described herein.

In some embodiments the invention thus provides a cap or closure comprising a polyethylene resin, wherein said polyethylene resin comprises at least two polyethylene fractions A and B, wherein said polyethylene resin a melt index (MI2), of at least 3.0 g/10 min to at most 5.5 g/10 min, and for instance of at least 3.5 g/10 min to at most 5.0 g/10 min, as measured (on pellets) according to ISO 1133, condition D, at 190° C. and under a load of 2.16 kg, and a density of at least 0.955 g/cm$^3$ to at most 0.965 g/cm$^3$, and for instance of about 0.960 g/cm$^3$, as measured (on pellets) according to ISO 1183 at 23° C., and a molecular weight distribution $M_w/M_n$ which is at most 7.0, and for instance of about 6.5, as determined by gel permeation chromatography, with $M_w$ being the weight-average molecular weight and $M_n$ being the number-average molecular weight; and wherein said polyethylene fraction A has a high load melt index (HLMI), as measured (on fluff) according to ISO 1133:1997 condition G at 190° C. and under a load of 21.6 kg, of at least 10.5 and a melt index (MI2) of at least 0.5 g/10 min to at most 1.5 g/10 min as measured according to ISO 1133, condition D, at 190° C. and under a load of 2.16 kg. For the term "comprising" in this context, it is preferably meant here that the cap or closure comprises from 50% to 100% by weight of the at least one polyethylene resin, preferably from 85% to 100% by weight, or from 90% to 100% by weight.

The caps and closures can be prepared by injection moulding or compression moulding the polyethylene resin as already defined herein-above. The invention therefore also encompasses a process for preparing a cap or closure comprising the steps of a) providing at least one polyethylene resin as described herein; and b) injection moulding or compression moulding said polyethylene resin into a cap or closure. Preferably, the caps and closures are prepared by injection moulding. Any injection machine known in the art may be used in the present invention, such as for example ENGEL 125T or NETSTAL Synergy 1000 injection moulding machine.

All mould types may be used. The caps and closures are particularly suitable for closing bottles, in particular bottles for carbonated or still drinks. Advantageously, the resin can be used for single-piece caps and closures, including screw caps. According to the present invention, a polyethylene resin is obtained that has good fluidity, even if its melt index is relatively low, good stiffness and good ESCR properties, which makes it particularly suitable for processing into caps meant for closing of bottles with (light) carbonated drinks.

The injection moulding cycle may be split into three stages: filling, packing-holding, and cooling. During filling, polymer melt is forced into an empty cold cavity; once the cavity is filled; extra material is packed inside the cavity and held under high pressure in order to compensate for density increase during cooling. The cooling stage starts when the cavity gate is sealed by polymer solidification; further temperature decreases and polymer crystallization takes place during the cooling stage. Typical temperatures for the filling step are from 160° C. to 280° C., preferably from 180° C. to 260° C., preferably from 200° C. to 230° C. Injection-moulding as used herein is performed using methods and equipment well known to the person skilled in the art. An overview of injection moulding and compression moulding is for example given in Injection Moulding Handbook, D. V. Rosato et al., 3rd edition, 2000, Kluwer Academic Publishers.

The moulds used in the production of the present caps and closures may be any mould usually used in the production of caps and closures, such as for example multi-cavity moulds wherein a number of caps and closures is produced simultaneously.

The caps and closures of the present application are not especially limited. They may include screw-caps, caps and closures with a living hinge, glossy caps and closures, transparent caps and closures.

The caps and closures of the present application may be used in various packaging applications, such as for example food or feed packaging, detergent packaging, cosmetic packaging, paint packaging, medical packaging, or packaging for chemical products. Examples in food or feed packaging are caps and closures on tubes, bottles, such as for juices, water or milk products. Examples in detergent packaging are caps and closures for washing powders, dish soap, household cleaners. Examples in cosmetic packaging are shower gels, shampoos, oils, creams, liquid soaps. Examples in medical packaging are packaging for pills, solutions, disinfectants. Examples in chemical packaging are packaging for (agro) chemicals, (motor) oils, lubricants, solvents.

Hence, the present encompasses a packaging comprising the above defined caps and closures.

In addition, the advantageous organoleptic properties and low volatile organic compounds content allow the caps and closures to be used in food application, in particular for closing bottles, such as bottles for carbonated and still drinks.

The invention will now be illustrated by the following, non-limiting illustrations of particular embodiments of the invention.

EXAMPLES

Test Methods
The following test methods were used.
The density was measured according to the method of standard ISO 1183 at a temperature of 23° C.

The melt index MI2 was measured according to the method of standard ISO 1133:1997, condition D, at 190° C. and under a load of 2.16 kg.

The melt index MI5 was measured according to the method of standard ISO 1133:1997, condition T, at 190° C. and under a load of 5 kg.

High load melt index HLMI was measured according to the method of standard ISO 1133:1997, condition G, at 190° C. and under a load of 21.6 kg.

Molecular weight ($M_n$ (number average molecular weight), $M_w$ (weight average molecular weight) and molecular weight distributions D (Mw/Mn), and D' (Mz/Mw)) was determined by size exclusion chromatography (SEC) and in particular by gel permeation chromatography (GPC).

Briefly, a GPC-IR5 from Polymer Char was used: 10 mg polyethylene sample was dissolved at 160° C. in 10 ml of trichlorobenzene for 1 hour. Injection volume: about 400 µl, automatic sample preparation and injection temperature: 160° C. Column temperature: 145° C. Detector temperature: 160° C. Two Shodex AT-806MS (Showa Denko) and one Styragel HT6E (Waters) columns were used with a flow rate of 1 ml/min. Detector: Infrared detector (2800-3000 cm$^{-1}$). Calibration: narrow standards of polystyrene (PS) (commercially available). Calculation of molecular weight Mi of each fraction i of eluted polyethylene is based on the Mark-Houwink relation ($\log_{10}(M_{PE})=0.965909\times\log_{10}(M_{PS})-0.28264$) (cut off on the low molecular weight end at $M_{PE}=1000$).

The molecular weight averages used in establishing molecular weight/property relationships are the number average ($M_n$), weight average ($M_w$) and z average ($M_z$) molecular weight. These averages are defined by the following expressions and are determined form the calculated $M_i$:

$$M_n = \frac{\sum_i N_i M_i}{\sum_i N_i} = \frac{\sum_i W_i}{\sum_i W_i/M_i} = \frac{\sum_i h_i}{\sum_i h_i/M_i}$$

$$M_w = \frac{\sum_i N_i M_i^2}{\sum_i N_i M_i} = \frac{\sum_i W_i M_i}{\sum_i W_i} = \frac{\sum_i h_i M_i}{\sum_i h_i}$$

$$M_z = \frac{\sum_i N_i M_i^3}{\sum_i N_i M_i^2} = \frac{\sum_i W_i M_i^2}{\sum_i W_i M_i} = \frac{\sum_i h_i M_i^2}{\sum_i h_i M_i}$$

Here $N_i$ and $W_i$ are the number and weight, respectively, of molecules having molecular weight Mi. The third representation in each case (farthest right) defines how one obtains these averages from SEC chromatograms. $h_i$ is the height (from baseline) of the SEC curve at the $i_{th}$ elution fraction and $M_i$ is the molecular weight of species eluting at this increment.

Tensile modulus was measured according to ISO 527-2 at 23° C. using specimen type 1B.

Stress at yield was measured according to ISO 527-2 at 23° C. using specimen type 1B.

The resin environmental stress crack resistance (Bell ESCR) (F50) was measured according to ASTM D 1693, Condition B at 50° C. using 100% Igepal CO-630 as a chemical agent (wherein Igepal CO-630 (CAS Number 68412-54-4) is commercially available from Rhodia). The ESCR value is reported as F50, the calculated 50 percent failure time from the probability graph.

The closure (cap) environmental stress crack resistance was measured at 40° C., 2 bar air pressure using 10% Igepal CO-630 as a chemical agent (wherein Igepal CO-630 (CAS Number 68412-54-4) is commercially available from Rhodia) on closures. Closures were prepared by injection-moulding using a Netstal Elion 3200 apparatus. A temperature controlled chamber was set to 40° C. Closures were clamped to pre-formed injection-moulded bottles by tightening the closures at a tightening torque of 2.2 Nm. The bottle part of the assembly is outfitted with tubing that is then attached to an air supply of the controlled chamber. The bottles with closures are turned upside down and immersed with a 10% Igepal CO-630 solution. The pressure inside the assembly is then monitored until a crack develops on the closure. The time it takes for a crack to develop is recorded. The ESCR value is reported as F50.

Capillary viscosity was measured at 220° C. on a Göttfert Rheograph 2002 capillary rheometer (barrel diameter of the rheometer (Db) of 12 mm), using ISO 11443, method A2, with a round hole die with a length/diameter ratio of 40/1 and an inlet angle of 180°, at shear rates ranging from 10 to 10 000 s-1. The pressure in the rheometer cylinder may be measured by a pressure sensor at the bottom of the cylinder. No conditioning of the samples was applied before the testing; the sample preheating time was 5 minutes; the dwell time was 20 minutes; the extrusion time varied in function of the shear rate applied, going from 10 seconds to about 1 minute.

VOC (volatile organic compounds) was measured according to Environmental Protection Agency (EPA) method no. 524.2 using Purge-and-trap gas chromatography/mass spectrometry (P&T-GC/MS). The method involves extracting (purging) volatile organic compounds and surrogates with low water solubility from a sample matrix by bubbling an inert gas through the aqueous sample. Purged sample components are trapped in a tube containing suitable sorbent materials. When purging is complete, the sorbent tube is heated and back flushed with helium to desorb the trapped sample components into a capillary gas chromatography (GC) column interfaced with a mass spectrometer (MS). The column in temperature programmed to facilitate the separation of the method analytes which are then detected with the MS. Compounds elution from the GC column are identified by comparing their measured mass spectra and retention times to reference spectra and retention times in a data base. Reference spectra and retention times for analytes are obtained by the measurement of calibration standards under the same conditions used for samples. Analytes are quantitated using procedural standard calibration. The concentration of each identified component is measured by relating the MS response of the quantitation ion produced by that compound to the MS response of the quantitation ion produced by that compound to the MS response of the quantitation ion produced by a compound that is used as an internal standard. Surrogate analytes, whose concentrations are known in every sample, are measured with the same internal standard calibration procedure. Samples were analysed using a system comprising of a Tekmar LSC 2000 purge-and-trap sampler and a gas chromatograph-quadrupole mass spectrometer, Fisons MD-800 GC-MS. Results for total VOC content on different resins are shown in Table 6.

Examples

The embodiments described herein may be further illustrated by the following non-limiting examples.

Example 1: Preparation of Polyethylene Resins

Polyethylene resins (Resins 1, 2 and 3) having bimodal molecular weight distribution were prepared in two serially connected slurry loop reactors (double loop reactor) under the conditions given below in Table 1. The Resins 1, 2 and 3 were prepared using a Ziegler Natta catalyst.

The Ziegler Natta Catalyst was produced in accordance with the procedure as described in WO 2011/095629, and in particular according to the following procedure, wherein TEAL was used as pre-activating agent.
  Step 1: BEM/TEAL (1:0.03)+2-ethylhexanol (2-EtOH) Mg(2-EtO)$_2$
  Step 2: Mg(2-EtO)$_2$+ClTi(OiPr)$_3$→product A
  Step 3: Product A+2TiCl$_4$/titanium (IV) butoxide (TN-BT)→product B
  Step 4: Product B+TiCl$_4$→Product C
  Step 5: Product C+TiCl$_4$→Product D
  Step 6: Product D+TEAl→Ziegler Natta catalyst system ("OiPr" represents "isopropoxide"—"BEM" represents Butylethylmagnesium)

The Ziegler Natta catalyst system applied in the examples has a catalyst particle size distribution d50 of about 6 μm as measured by laser diffraction analysis on a Malvern type analyser (e.g. Malvern 2000S) after having put the catalyst in suspension in cyclohexane. The particle size distribution d50 is defined as the particle size for which fifty percent by volume of the particles has a size lower than the d50.

Polymerization was initiated in the first reactor by continuously feeding the catalyst and co-catalyst together with ethylene, hydrogen, and 1-hexene. The resulting polymer, mixed with active catalyst, was withdrawn from the first reactor, and transferred to a second reactor. Ethylene and hydrogen were introduced into the second reactor, where they came into contact with the polymer and catalyst from the first reactor. In the second reactor, the co-catalyst (TEAL) was again introduced. The final product blend was continuously removed.

Pelletization was performed on a twin screw extruder.

TABLE 1

Operating conditions and analytical results for the polyethylene resins

|  |  |  | Resin 1 | Resin 2 | Resin 3 |
| --- | --- | --- | --- | --- | --- |
| First reactor operating conditions | Temperature | (° C.) | 90.0 | 90.0 | 90.0 |
|  | Ethylene | (kg/h) | 21.0 | 28.0 | 28.0 |
|  | 1-hexene | (kg/h) | 0.85 | 0.80 | 0.83 |
|  | H2 | (Nl/h) | 29 | 50 | 60 |
|  | Isobutane | (kg/h) | 65 | 65 | 65 |

TABLE 1-continued

Operating conditions and analytical results for the polyethylene resins

|  |  |  | Resin 1 | Resin 2 | Resin 3 |
|---|---|---|---|---|---|
| Contribution | First reactor | (wt %) | 42.0 | 52.0 | 52.2 |
| First reactor analytical results | MI2 | (g/10 min) | 0.50 | 0.76 | 0.94 |
|  | MI5 | (g/10 min) | 1.2 | 2.4 | 2.9 |
|  | HLMI | (g/10 min) | 11.6 | 25.6 | 32.5 |
|  | Density | (g/cm$^3$) | 0.946 | 0.950 | 0.951 |
| Second reactor operating conditions | Temperature | (° C.) | 95.0 | 95.0 | 95.0 |
|  | Ethylene | (kg/h) | 30.5 | 27.0 | 27.0 |
|  | 1-hexene | (kg/h) | 0 | 0 | 0 |
|  | H2 | (Nl/h) | 625 | 475 | 610 |
|  | Isobutane | (kg/h) | 45 | 45 | 45 |
|  | Calculated density fraction reactor 2 | (g/cm$^3$) | 0.972 | 0.969 | 0.972 |
| Contribution | Second reactor | (wt %) | 58 | 48 | 47.8 |
| Second reactor analytical results (fluff) | MI2 | (g/10 min) | 4.1 | 4.2 | 5.1 |
|  | MI5 | (g/10 min) | 13.5 | 13.5 | 15.6 |
|  | HLMI | (g/10 min) | 180 | 164 | 201 |
|  | Density | (g/cm$^3$) | 0.961 | 0.959 | 0.961 |
| Second reactor analytical results (pellets) | MI2 | (g/10 min) | 3.8 | 3.7 | 4.5 |
|  | MI5 | (g/10 min) | 13.0 | 12.5 | 15.0 |
|  | HLMI | (g/10 min) | 173 | 158 | 197 |
|  | Density | (g/cm$^3$) | 0.960 | 0.960 | 0.960 |
| GPC (pellets) | Mn | Da | 12613 | 13092 | 12020 |
|  | Mw | Da | 85306 | 85764 | 82547 |
|  | Mz | Da | 473906 | 465713 | 476888 |
|  | D |  | 6.8 | 6.6 | 6.9 |
|  | D' |  | 5.6 | 5.4 | 5.8 |

Example 2: Polyethylene Resins for Cap Application: Comparison of Different Polyethylene Resins Materials Used The properties of the Resins 1, 2 and 3 are shown in Table 1 of Example 1. In addition, the following comparative resins CE01 to CE04 were applied in the examples.

CE01 corresponds to a monomodal polyethylene resin having a density of 0.962 g/cm$^3$ (ISO 1183), a MI2 melt index (190° C./2.16 kg) of 8.4 g/10 min (ISO 1133-D), and a Mw/Mn of 4.8.

CE02 corresponds to a monomodal polyethylene resin having a density of 0.951 g/cm$^3$ (ISO 1183), a MI2 melt index (190° C./2.16 kg) of 4.0 g/10 min (ISO 1133-D), and a Mw/Mn of 4.3.

CE03 corresponds to a monomodal polyethylene resin having a density of 0.954 g/cm$^3$ (ISO 1183), a MI2 melt index (190° C./2.16 kg) of 1.9 g/10 min (ISO 1133-D), and a Mw/Mn of 5.5.

CE04 corresponds to a monomodal polyethylene resin having a density of 0.960 g/cm$^3$ (ISO 1183), a MI2 melt index (190° C./2.16 kg) of 7.6 g/10 min (ISO 1133-D), and a Mw/Mn of 4.0.

ESCR Analyses

ESCR analyses following the ASTM D 1693 standard were performed on Resins 1, 2 and 3 and compared with the ESCR results obtained when using the above-indicated comparative polyethylene resins. The results of the ESCR analyses are shown in Table 2.

From the results it can be seen that Resins 1, 2 and 3 show overall improved ESCR properties as compared to CE01, CE02, CE03 and CE04.

TABLE 2

ESCR analyses on moulded plates made from resins

|  |  | Resin 1 | Resin 2 | Resin 3 | CE01 | CE02 | CE03 | CE04 |
|---|---|---|---|---|---|---|---|---|
| Bell-ESCR in 100% Igepal (50° C.) (ASTM D1693) | F50 (hrs) | 62.0 | 33.0 | 19.0 | 4.0 | 18.0 | 12.0 | 4.0 |

ESCR analyses were also performed on the caps made from Resins 1 and 2 and compared with the ESCR results obtained on caps prepared with polyethylene resin CE01. The caps were prepared by injection-moulding using a Netstal Elion 3200 apparatus into caps of 26 mm (about 9 g) at an injection temperature of 240° C. ESCR analyses were performed under the test conditions as described above. Results for each of the resins are represented in Table 3.

Table 3 shows that improved ESCR results can be obtained for the caps made from Resins 1 and 2. Looking at the ESCR results on caps made from Resin 1 and Resin 2 and CE01, environmental stress cracking resistance for caps made with resins according to the invention is about twice higher than for caps made from CE01.

TABLE 3

ESCR analyses on caps made from resins

|  |  | Resin 1 | Resin 2 | CE01 |
|---|---|---|---|---|
| ESCR in Igepal CO630 10% in 40° C. | F50 (hrs) | 5.0 | 5.3 | 2.8 |

Modulus Analyses

Modulus analyses were performed on Resins 1 to 3 and compared with the results obtained when using certain of the above-indicated comparative polyethylene resins. The results are shown in Table 4.

From the results it can be observed that Resins 1 to 3 show relatively high tensile modulus, which provides an indication of good stiffness properties, with a stress at yield comparable to that of the comparative resins.

TABLE 4

Modulus analyses

|  |  | Resin 1 | Resin 2 | Resin 3 | CE01 | CE02 | CE03 |
|---|---|---|---|---|---|---|---|
| Tensile modulus (ISO 527-2) | MPa | 1260 | 1279 | 1365 | 1386 | 916 | 1081 |
| Stress at yield (ISO 527-2) | MPa | 29.7 | 30.3 | 30.6 | 29.9 | 29.9 | 23.7 |

Viscosity Analyses

Rheology analyses were also performed on Resins 1 to 3 and compared with the results obtained when using above-indicated comparative polyethylene resins. The viscosity as a function of shear rates was analysed by capillary rheology at 220° C. over a wide range of shear rates (10 to 10 000 s-1) in accordance with ISO 11443. The viscosity at a shear rate of 1000 s-1 for each of the resins tested is represented in Table 5 below. The shear rate of 1000 s-1 may be considered as indicative for ease of processing of the resins. From the results it can be seen that Resins 1 to 3 show a similar rheology curve, and that they have a viscosity at 1000 s-1 which is comparable to that of resins having a high melt index (CE01 and CE04). The results are shown in FIG. 1, which plots viscosity (Pa·s) of Resin 1 to 3, CE01 and CE04 as a function of shear rate (1/s).

TABLE 5

Viscosity analyses

|  |  | Resin 1 | Resin 2 | Resin 3 | CE01 | CE02 | CE03 | CE04 |
|---|---|---|---|---|---|---|---|---|
| Viscosity at 1000 s−1 (ISO 11443) | Pa · s | 198 | 211 | 178 | 178 | 270 | 312 | 212 |

VOC Analyses

The total VOC content was also measured on Resins 1 and 2 and compared with the results obtained when using polyethylene resin CE01. Results are represented in Table 6 below. The obtained results for Resins 1 and 2 are in the same order as those of CE01.

TABLE 6

VOC analyses

|  |  | Resin 1 | Resin 2 | CE01 |
|---|---|---|---|---|
| VOC content (EPA method 524.2) | ppm | 536 | 440 | 392 |

The invention claimed is:

1. A polyethylene resin comprising at least two polyethylene fractions A and B,
wherein the polyethylene resin has
a melt index (MI2), of at least 3.0 g/10 min to at most 5.5 g/10 min as measured according to ISO 1133, condition D, at 190° C. and under a load of 2.16 kg, and
a density of at least 0.955 g/cm$^3$ to at most 0.965 g/cm$^3$ as measured according to ISO 1183 at 23° C., and
a molecular weight distribution $M_w/M_n$ which is at most 7.0, as determined by gel permeation chromatography, with $M_w$ being the weight-average molecular weight and $M_n$ being the number-average molecular weight; and
wherein the polyethylene fraction A has
a high load melt index (HLMI), as measured according to ISO 1133:1997 condition G at 190° C. and under a load of 21.6 kg, of at least 10.5; and
a melt index (MI2) as measured according to ISO 1133, condition D, at 190° C. and under a load of 2.16 kg of at least 0.5 g/10 min to at most 1.5 g/10 min.

2. The polyethylene resin according to claim 1, wherein the polyethylene resin has a molecular weight distribution $M_w/M_n$ which is at least 4.0.

3. The polyethylene resin according to claim 1, wherein the polyethylene resin has a melt index (MI2), of at least 3.5 g/10 min to at most 5.0 g/10 min, as measured according to ISO 1133, condition D, at 190° C. and under a load of 2.16 kg.

4. The polyethylene resin according to claim 1, wherein the polyethylene resin has a high load melt index (HLMI), as measured on pellets according to ISO 1133:1997 condition G at 190° C. and under a load of 21.6 kg, of at least 150.

5. The polyethylene resin according to claim 1, wherein the polyethylene fraction A has a high load melt index (HLMI), as measured according to ISO 1133:1997 condition G at 190° C. and under a load of 21.6 kg, of at most 50.

6. The polyethylene resin according to claim 1, wherein the polyethylene fraction A has a density of at least 0.940 g/cm³ to at most 0.955 g/cm³, as measured according to ISO 1183 at 23° C.

7. The polyethylene resin according to claim 1, wherein the polyethylene resin comprises at least 35.0% to at most 60.0% by weight of the polyethylene fraction A, based on a total weight of the polyethylene resin.

8. The polyethylene resin according to claim 1, wherein the polyethylene fraction A is an ethylene copolymer and the polyethylene fraction B is an ethylene homopolymer.

9. The polyethylene resin according to claim 1, wherein the polyethylene resin is a Ziegler-Natta-catalyzed polyethylene resin.

10. A process for preparing a polyethylene resin comprising at least two polyethylene fractions A and B, comprising:
   a) feeding ethylene monomer, a diluent, at least one catalyst, optionally hydrogen, and optionally one or more olefin co-monomers into at least one first reactor; polymerizing the ethylene monomer, and the optionally one or more olefin co-monomers, in the presence of the catalyst, and optional hydrogen, in the first reactor to produce a polyethylene fraction A; and
   b) feeding the polyethylene fraction A to a second reactor serially connected to the first reactor, and in the second reactor polymerizing ethylene, and optionally one or more olefin co-monomers, in the presence of the polyethylene fraction A, and optionally hydrogen, thereby producing the polyethylene resin, wherein the polyethylene resin has
      a melt index (MI2), of at least 3.0 g/10 min to at most 5.5 g/10 min as measured according to ISO 1133, condition D, at 190° C. and under a load of 2.16 kg, and
      a density of at least 0.955 g/cm³ to at most 0.965 g/cm³ as measured according to ISO 1183 at 23° C., and
      a molecular weight distribution $M_w/M_n$ which is at most 7.0, as determined by gel permeation chromatography, with $M_w$ being the weight-average molecular weight and $M_n$ being the number-average molecular weight; and
   wherein the polyethylene fraction A has
      a high load melt index (HLMI), as measured according to ISO 1133:1997 condition G at 190° C. and under a load of 21.6 kg, of at least 10.5; and
      a melt index (MI2) as measured according to ISO 1133, condition D, at 190° C. and under a load of 2.16 kg of at least 0.5 g/10 min to at most 1.5 g/10 min.

11. The process according to claim 10, wherein the at least one catalyst is a Ziegler-Natta catalyst.

12. A cap or closure comprising at least one polyethylene resin comprising at least two polyethylene fractions A and B, wherein the polyethylene resin has
   a melt index (MI2), of at least 3.0 g/10 min to at most 5.5 g/10 min as measured according to ISO 1133, condition D, at 190° C. and under a load of 2.16 kg, and
   a density of at least 0.955 g/cm³ to at most 0.965 g/cm³ as measured according to ISO 1183 at 23° C., and
   a molecular weight distribution $M_w/M_n$ which is at most 7.0, as determined by gel permeation chromatography, with $M_w$ being the weight-average molecular weight and $M_n$ being the number-average molecular weight; and
wherein the polyethylene fraction A has
   a high load melt index (HLMI), as measured according to ISO 1133:1997 condition G at 190° C. and under a load of 21.6 kg, of at least 10.5; and
   a melt index (MI2) as measured according to ISO 1133, condition D, at 190° C. and under a load of 2.16 kg of at least 0.5 g/10 min to at most 1.5 g/10 min.

13. A process for producing a cap or closure, comprising injection moulding or compression moulding a polyethylene resin into a cap or closure, wherein the polyethylene resin comprises at least two polyethylene fractions A and B, wherein the polyethylene resin has
   a melt index (MI2), of at least 3.0 g/10 min to at most 5.5 g/10 min as measured according to ISO 1133, condition D, at 190° C. and under a load of 2.16 kg, and
   a density of at least 0.955 g/cm³ to at most 0.965 g/cm³ as measured according to ISO 1183 at 23° C., and
   a molecular weight distribution $M_w/M_n$ which is at most 7.0, as determined by gel permeation chromatography, with $M_w$ being the weight-average molecular weight and $M_n$ being the number-average molecular weight; and
wherein the polyethylene fraction A has
   a high load melt index (HLMI), as measured according to ISO 1133:1997 condition G at 190° C. and under a load of 21.6 kg, of at least 10.5; and
   a melt index (MI2) as measured according to ISO 1133, condition D, at 190° C. and under a load of 2.16 kg of at least 0.5 g/10 min to at most 1.5 g/10 min.

\* \* \* \* \*